(12) United States Patent
Portelli et al.

(10) Patent No.: US 12,107,912 B1
(45) Date of Patent: *Oct. 1, 2024

(54) EMBEDDING REMOTE APPLICATIONS INTO HTML PAGES

(71) Applicant: PARALLELS INTERNATIONAL GmbH, Schaffhausen (CH)

(72) Inventors: Joseph Portelli, Sliema (MT); Nikolay Dobrovlskiy, Moscow (RU); Serguei M. Beloussov, Singapore (SG)

(73) Assignee: Parallels International GmbH, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/971,283

(22) Filed: Oct. 21, 2022

Related U.S. Application Data

(63) Continuation of application No. 17/481,613, filed on Sep. 22, 2021, now Pat. No. 11,509,707, which is a continuation of application No. 15/825,595, filed on Nov. 29, 2017, now Pat. No. 11,153,364.

(51) Int. Cl.
- *H04L 67/025* (2022.01)
- *G06F 9/455* (2018.01)
- *H04L 67/306* (2022.01)

(52) U.S. Cl.
CPC ........ H04L 67/025 (2013.01); G06F 9/45545 (2013.01); H04L 67/306 (2013.01)

(58) Field of Classification Search
None
See application file for complete search history.

(56) References Cited

U.S. PATENT DOCUMENTS

| | | |
|---|---|---|
| 6,370,552 B1 | 4/2002 | Bloomfield |
| 7,032,168 B1 | 4/2006 | Gerace |
| 2006/0212803 A1 | 9/2006 | Arokiaswamy |
| (Continued) | | |

OTHER PUBLICATIONS

"How Parallels Remote Application Server Enhances Microsoft RDS", White Paper, Parallels Remote Application Server, https://www.parallels.com/fileadmin/docs/ras/resources/WP_MaxRemoteDesktopServices_EN_A4.pdf, 11 pages, 2017.

(Continued)

*Primary Examiner* — Tonia L Dollinger
*Assistant Examiner* — Ishrat Rashid
(74) *Attorney, Agent, or Firm* — Rosenberg, Klein & Lee

(57) ABSTRACT

Systems and methods for embedding remote applications into HyperText Markup Language (HTML) pages. An example method comprises: identifying, within a HTML page rendered by a browser, a frame referencing a remote application; determining at least one of: a size of a window for rendering output of the remote application on a virtual desktop produced by a virtual execution environment running the remote application or a position of the window on the virtual desktop; causing a remote access session to be established with the virtual execution environment; transmitting a first message specifying at least one of: the size of the window on the virtual desktop or the position of the window on the virtual desktop; and causing the frame to be displayed within the HTML page by the browser for rendering output of the remote application.

18 Claims, 7 Drawing Sheets

(56) References Cited

U.S. PATENT DOCUMENTS

| | | |
|---|---|---|
| 2007/0260702 A1* | 11/2007 | Richardson ............ G06F 16/95 |
| | | 709/217 |
| 2008/0091663 A1* | 4/2008 | Inala .................... H04L 67/567 |
| 2009/0276667 A1 | 11/2009 | Dopson et al. |
| 2009/0327905 A1 | 12/2009 | Mascarenhas et al. |
| 2010/0269135 A1 | 10/2010 | Hulse et al. |
| 2011/0083102 A1 | 4/2011 | Adachi |
| 2011/0246904 A1 | 10/2011 | Pinto et al. |
| 2012/0011445 A1 | 1/2012 | Gilboa |
| 2012/0084381 A1 | 4/2012 | Alladi et al. |
| 2014/0026057 A1* | 1/2014 | Kimpton ................ G06F 9/451 |
| | | 715/733 |
| 2016/0342313 A1 | 11/2016 | Gross et al. |

OTHER PUBLICATIONS

"Parallels Remote Application Server", Solutions Guide v15.5, https://www.parallels.com/fileadmin/docs/rasiresources/Parallels-RAS-v15-5-Solutions-Guide.pdf, 43 pages, 1999-2017.

"Parallels Remote Appliction Server", Administrators Guide v15.5 Update 2, https://download.parallels.com/rasiv15.5/docs/en_US/Parallels-RAS-v15-5-Administrators-Guide.pdf, 248 pages, 1999-2017.

* cited by examiner

EMBEDDING REMOTE APPLICATIONS INTO HTML PAGES

CROSS-REFERENCE TO RELATED APPLICATIONS

This application claims the benefit of priority as a continuation of U.S. patent application Ser. No. 17/481,613 filed Sep. 22, 2021; which itself claims the benefit of priority from U.S. patent application Ser. No. 15/825,595 filed Nov. 29, 2017, which has issued as U.S. Pat. No. 11,153,364; the entire contents of which are incorporated herein by reference.

TECHNICAL FIELD

The present disclosure is generally related to virtualized computer systems, and is specifically related to systems and methods for embedding remote applications into HyperText Markup Language (HTML) pages.

BACKGROUND

Remote Desktop Services (RDS) and various other remote access solutions allow a user to connect over a network to a remote computer or virtual machine, thus making the entire desktop or one or more applications running on the remote computer or virtual machine accessible via a client application running on a client device. The client application is responsible for forwarding graphical user interface (GUI) events to the remote computer or virtual machine, as well as for rendering on the client screen the graphics received from the remote computer or virtual machine.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
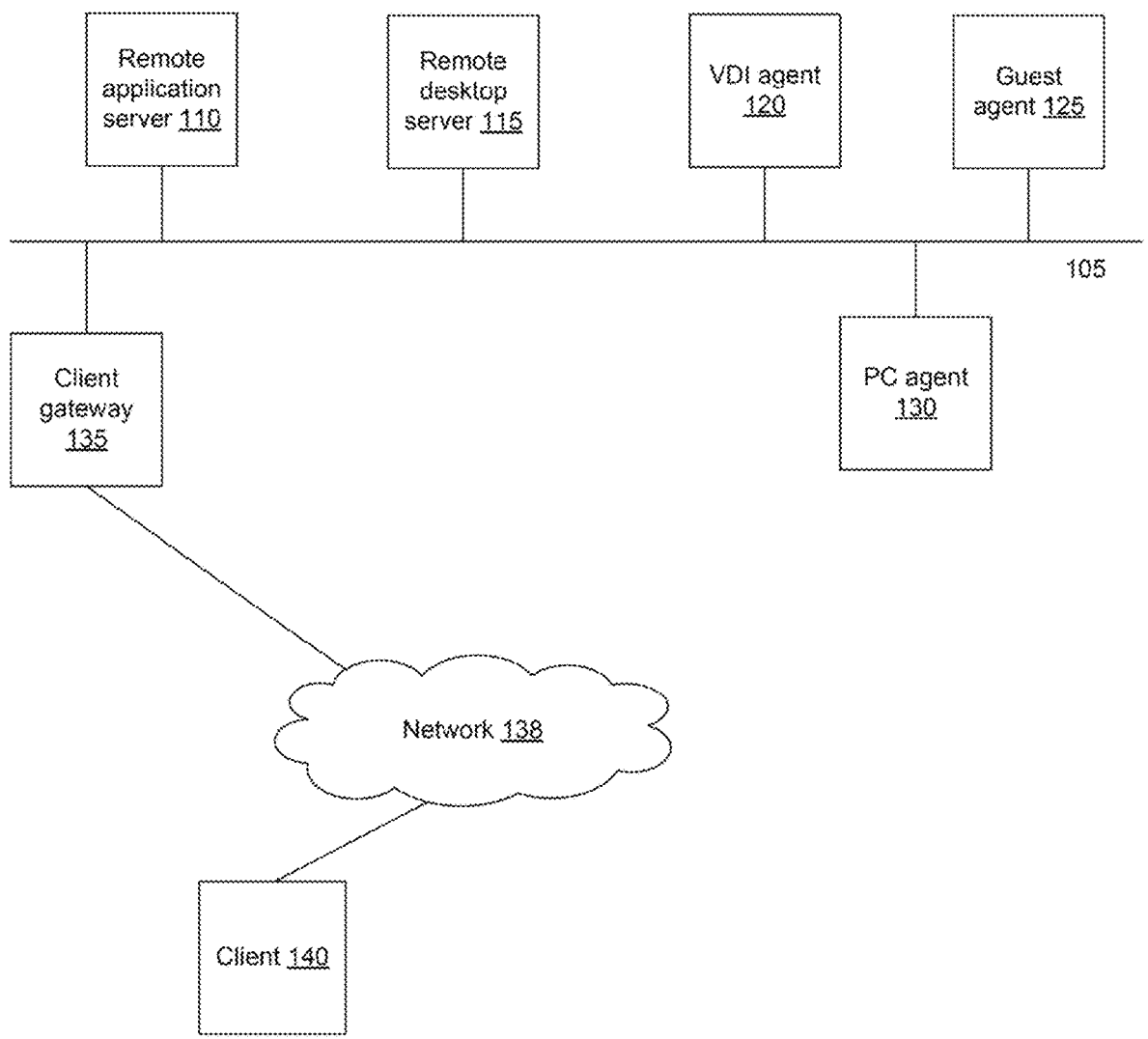
FIG. 1 schematically illustrates an example component diagram of a network architecture in which the methods and systems described herein may be implemented.

Described herein are systems and methods for embedding remote applications into HTML pages.

A remote application server, such as Parallels® Remote Application Server (RAS) facilitates connections of client devices (such as personal computers or mobile devices) to various virtual execution environments that are running on one or more servers. In an illustrative example, a virtual execution environment may be implemented by a multi-user terminal server (also referred to as "remote desktop server"). In another illustrative example, a virtual execution environment may be implemented by a virtual desktop interface (VDI) agent running on a host computer system executing one or more virtual machines that are managed by a hypervisor (e.g., Hyper-V®, VMware®, or Xen®). In yet another illustrative example, a virtual execution environment may be implemented by a guest agent installed in a guest operating system of a virtual machine running on a host computer system. In yet another illustrative example, a virtual execution environment may be implemented by a remote personal computer (PC) agent running on a personal computer system. A user connecting to a remote application server utilizing a remote application client (Parallels® client) may access, via the Remote Desktop Protocol (RDP), remote applications running in one or more virtual execution environments. The remote application server may additionally provide client authentication, load balancing, and/or other features related to brokering the client connections to the virtual execution environments.

In certain implementations, the remote application server may further provide a client gateway in order to allow accessing remote applications running in virtual execution environments by HTML5-enabled browsers. The gateway serves, to a client device, a JavaScript code for parsing the data received from a virtual execution environment and displaying the data by the client browser.

Thus, a system administrator may configure a web portal to display published remote applications in one or more HTML pages which may be accessed by HTML5-enabled browsers running on the client devices.

However, in order to allow embedded frames of remote applications running in one or more virtual execution environments to be correctly rendered by a client browser, certain additional processing needs to be performed, including coordination of frame positions and sizes within the client browser window and corresponding windows rendered by the virtual execution environments, translation of pointing device (e.g., mouse) input into coordinates of the corresponding virtual execution environment, and/or processing of certain other graphical user interface (GUI) events. Various HTML5 gateway implementations may fail to adequately perform one or more of the above-listed functions.

The present disclosure addresses the above-noted and other deficiencies of common implementations by providing system and methods for embedding remote applications into HTML pages. In an illustrative example, a client gateway component of a remote application server may inject, into a HTML page that includes one or more frames for embedded remote applications, a client-side script (e.g., one or more JavaScript modules) that is executed by the client browser upon loading the HTML page and performs coordination of frame positions and sizes within the client browser window and corresponding windows rendered by virtual execution environments, translation of pointing device input into coordinates of the corresponding virtual execution environment, and/or processing of certain other graphical user interface (GUI) events, as described in more detail herein below.

The systems and methods described herein may be implemented by hardware (e.g., general purpose and/or specialized processing devices, and/or other devices and associated circuitry), software (e.g., instructions executable by a processing device), or a combination thereof. Various aspects of the above referenced methods and systems are described in details herein below by way of examples, rather than by way of limitation.

FIG. 1 schematically illustrates an example component diagram of a network architecture in which the methods and systems described herein may be implemented. Computer systems, appliances, network segments, and other software or hardware components are shown in FIG. 1 for illustrative purposes only, and the scope of the present disclosure is not limited to the architecture shown in FIG. 1. Routers, firewalls, load balancers, network switches, and/or various other software or hardware components may be omitted from FIG. 1 for clarity. Various other computer systems, software or hardware components, and/or methods of their interconnection which are not shown in FIG. 1 may be compatible with the methods and systems described herein.

As schematically illustrated by FIG. 1, the distributed computer system 1000 may comprise one or more remote application servers 110 which may communicate, over a network 105, with one or more virtualized execution environments. In an illustrative example, the virtual execution environment may include one or more remote desktop servers 115. In another illustrative example, the virtual execution environment may include one or more virtual desktop interface (VDI) agents 120 running on respective host computer systems virtual machines. In yet another illustrative example, the virtual execution environment may include one or more guest agents 125. In yet another illustrative example, the virtual execution environment may include one or more remote personal computer (PC) agents 130 running on respective personal computer systems.

One or more client gateways 135 may be employed for facilitating communications, over network 138, of one or more client devices 140 with remote application servers 110 and/or virtualized execution environments 115, 120, 125, and 130. In an illustrative example, the client gateway 135 may perform authentication of a user of a client device based on received user account credentials and/or other authentication factors. In certain implementations, the client gateway 135 may allow browser-based client access to remote applications running in the virtualized execution environments. The client gateway 135 may serve, to a client device 140, a JavaScript code for parsing the data received from a virtual execution environment and displaying the data by the client browser.

As noted herein above, a system administrator may configure a web portal to display published remote applications in one or more HTML pages which may be accessed by HTML5-enabled browsers running on the client devices. Thus, from the users' perspective, the published remote applications will be perceived as web-based applications, while in reality they are executed by the respective virtualized execution environments.

Therefore, systems and methods of the present disclosure may be utilized for facilitating Bring Your Own Device (BYOD) practice, which involves an organization allowing their members and/or employees to use personally owned computing devices (such as portable computers, tablets, and/or smartphones) to access the applications and/or data residing on the organization's protected network (e.g., the organization's intranet). The client devices may safely access and utilize various data residing on the organization's protected network, since all application data associated with the business applications is stored within the organization's protected network, while no application data is stored locally on any of the client devices. Furthermore, unauthorized possession of a client device (e.g., due to the device having been lost or stolen) would not result in unauthorized access to the applications and data residing on the organization's protected network.

Figure 2:
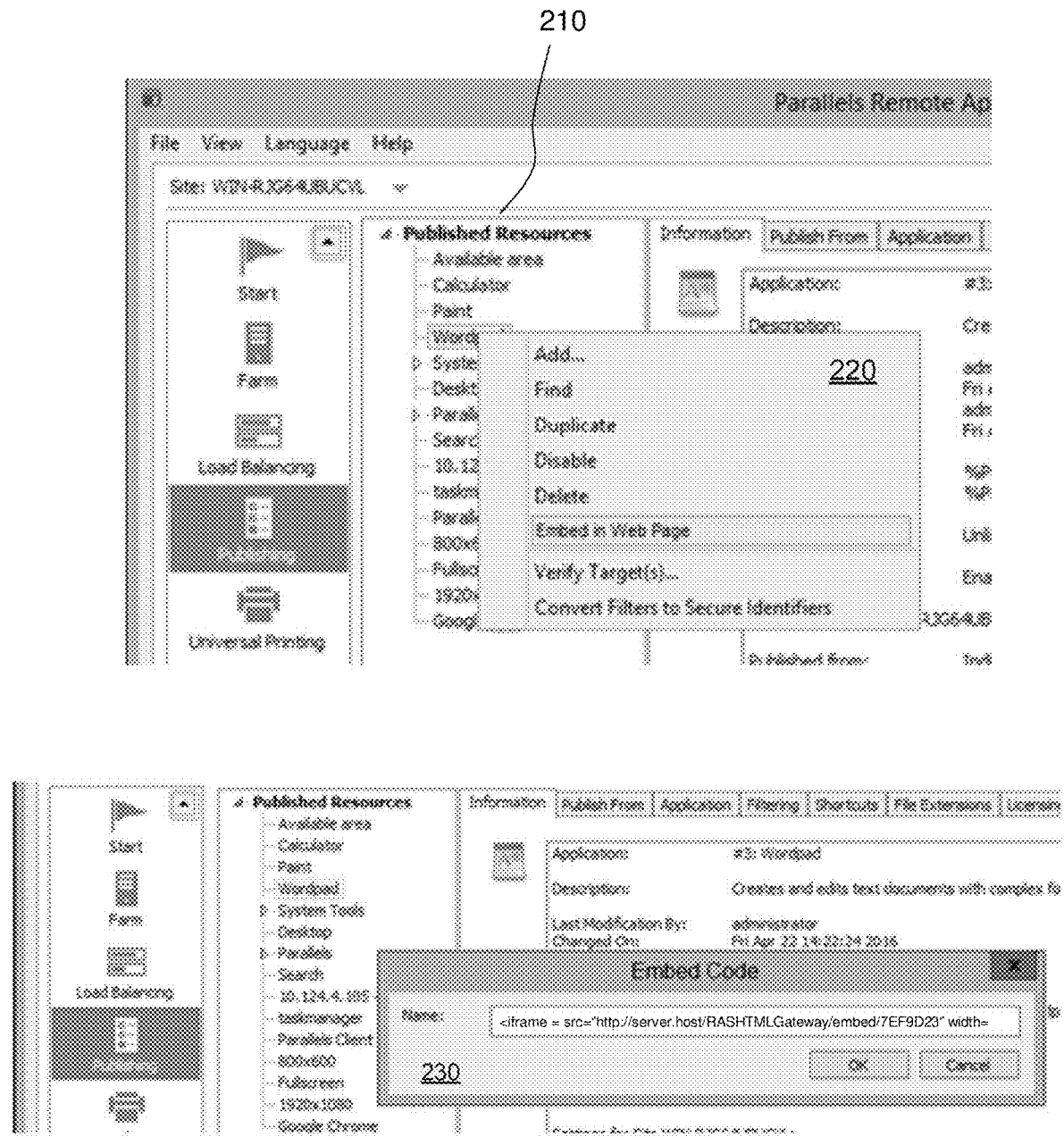
FIG. 2 schematically illustrates example output produced by a console of a remote application server operating in accordance with one or more aspects of the present disclosure.
Figure 3:
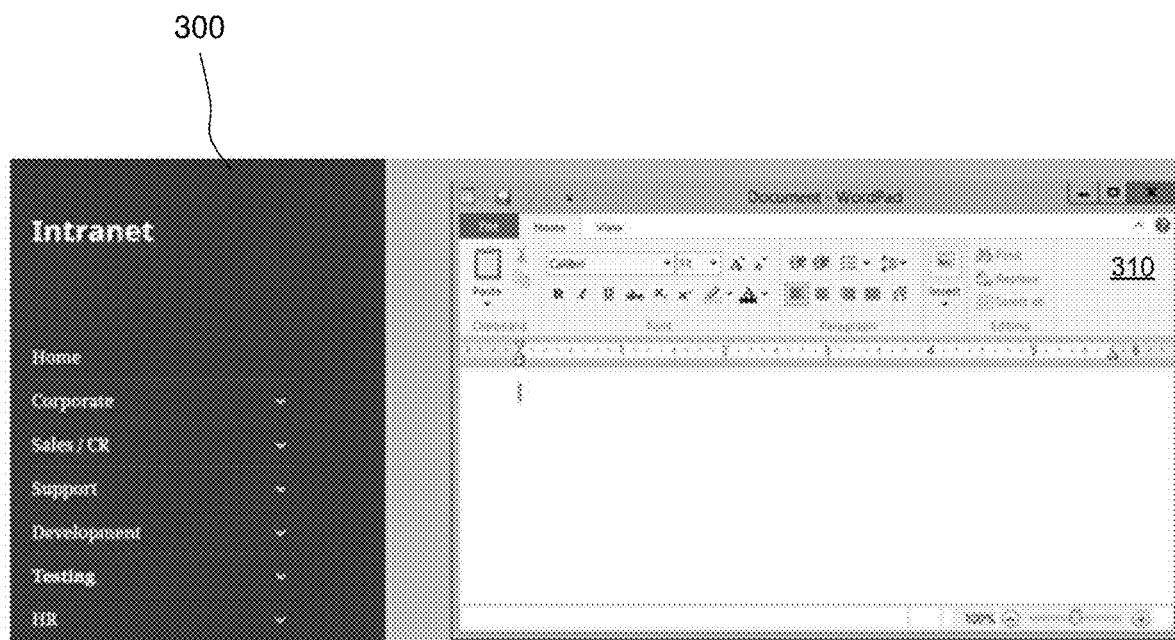
FIG. 3 schematically illustrates an example embedded application frame rendered by a client browser, in accordance with one or more aspects of the present disclosure.

As schematically illustrated by FIG. 2, a console of the remote application server 110 may be employed for displaying a list 210 of published applications. A right click-triggered menu 220 associated with each entry of the list may include a plurality of actions accessible to a system administrator with respect to the currently selected published application, including embedding the published application into a HTML page. Responsive to detecting selection of the "Embed in HTML page" option, the console may display a popup window 230 showing an HTML markup which may be inserted into a HTML page served by a web portal. The hyperlink may include the client gateway identifier, the published application identifier, and the height and width of the frame to be displayed by the client device for rendering the application output. As schematically illustrated by FIG. 3, selecting the hyperlink from the web portal page 300 would open a frame 310 for displaying the output of the selected published application.

As noted herein above, in order to allow embedded frames of remote applications running in one or more virtual execution environments to be correctly rendered by a client browser, certain additional processing needs to be performed, including coordination of frame positions and sizes within the client browser window and corresponding windows rendered by the virtual execution environments, translation of pointing device input into coordinates of the corresponding virtual execution environment, and/or processing of certain other graphical user interface (GUI) events.

In certain implementations, one or more of the above-listed functions may be performed by a client-side executable script (e.g., one or more JavaScript modules), which may be injected into the HTML pages that include embedded published applications. Upon loading the HTML page containing the client-side executable script, the browser may initiate execution of the script.

The client-side executable script may scan the HTML page which has initiated the script execution to identify the frames (e.g., marked by <iframe> tags) that contain hyperlinks to the published applications. For each identified frame, the client-side executable script may parse the embedded application hyperlink contained by the frame in order to extract the height and width of the frame to be displayed by the client device for rendering the application output.

Figure 4:
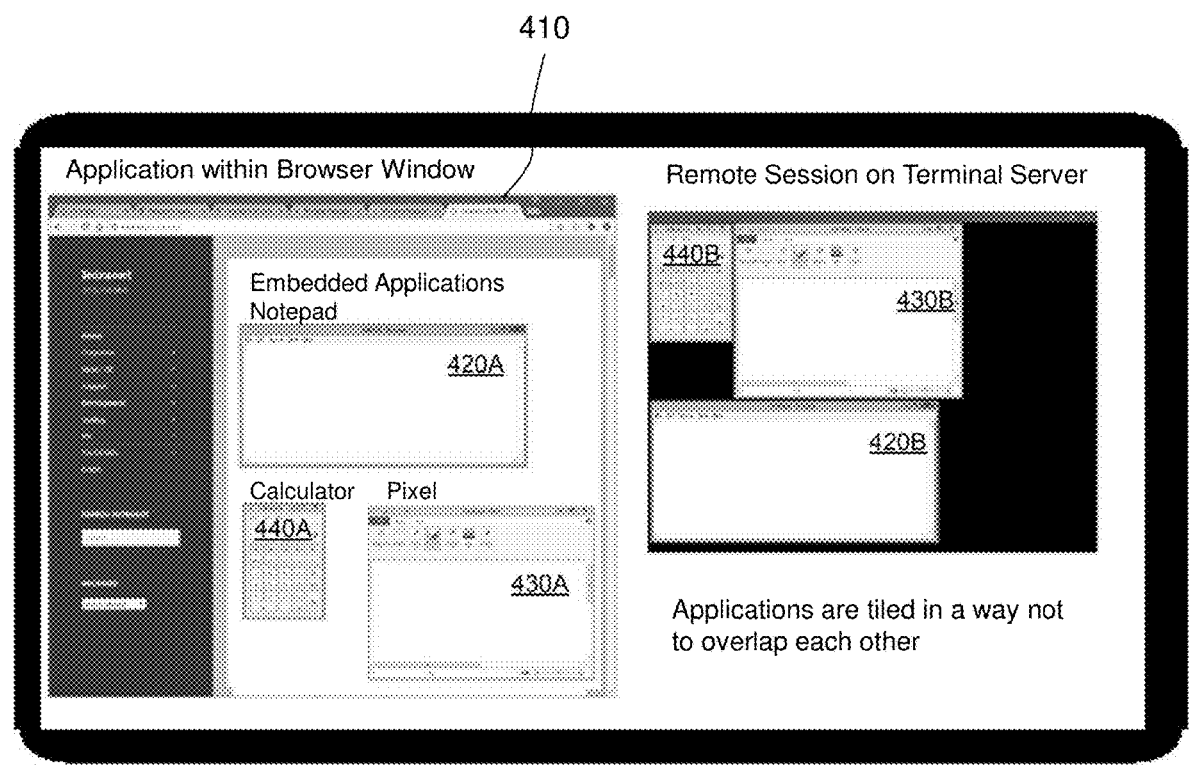
FIG. 4 schematically illustrates example embedded application frames rendered by a client browser and corresponding application windows on a desktop of a virtual execution environment, in accordance with one or more aspects of the present disclosure.

Based on the sizes for all embedded application frames contained by the HTML page which has initiated the script execution, the client-side executable script may determine the sizes and positions of the corresponding application windows on a virtual desktop produced by a virtual execution environment running the remote applications, as schematically illustrated by FIG. 4. "Virtual desktop produced by a virtual execution environment" as used herein refers to a window of a remote access session established by the client gateway 135 of FIG. 1 with the virtual execution environment. Accordingly, positions of the embedded application frames within the HTML page which has initiated the script execution may be different from positions of the respective application windows on the virtual desktop rendered by the virtual execution environment, while width and height of each application frame displayed by the HTML page would generally match the width and height of the corresponding application window rendered by the virtual execution environment. As shown in FIG. 4, a client browser may render an HTML page 410 which includes embedded application frames 420A, 430A, and 440A associated with respective applications that are published by the virtual execution environment. The virtual execution environment may render, on its virtual desktop, application windows 420B, 430B, and 440B corresponding to the frames 420A, 430A, and 440A.

In order to determine the positions of the embedded application windows on the virtual desktop, the client-side executable script may apply a heuristic optimization method to minimize the total area of the virtual desktop that would fit, without window overlapping, the windows of all published applications that are referenced by HTML page which has initiated the script execution by the client device.

The client-side executable script may then transmit, to the client gateway, a message specifying the sizes and positions of the embedded application windows on the virtual desktop, thus signaling the client gateway to establish a remote access session with the virtual execution environment which runs the remote applications referenced by the HTML page which has initiated the script execution.

Responsive to receiving the message, the client gateway may attempt to identify an existing remote access session with the virtual execution environment, such that the session is owned by the user account associated with the HTML page which initiated the message originator script. If such a session does not exist, the client gateway may establish a new remote access session with the virtual execution environment on behalf of the user account associated with the HTML page which initiated the message originator script.

The client gateway may then send, to the virtual execution environment, a message specifying the sizes and positions of the windows on a virtual desktop associated with the identified or newly established session. Responsive to receiving the message, the virtual execution environment may launch the specified applications and re-size and position their respective windows on the virtual desktop according to the window positions and sizes specified by the message originated by the client gateway.

The client browser may execute the received JavaScript in order to render each application's graphic output in a respective frame of the currently displayed HTML page. The client-side executable script may further perform translation of pointing device input into coordinates on the desktop of the corresponding virtual execution environment. In an illustrative example, the client-side executable script may implement the pointer lock with respect to the pointer associated with the pointing device. The pointer lock involves "locking" the pointer within a frame upon receiving a pointer locking user interface command (e.g., the left mouse button click) while the pointer is within the frame, such that no pointing device movement would bring the pointer outside of the frame, until an unlocking user interface command (e.g., the Escape key) is received. Therefore, the pointer events are not sent to the virtual execution environment until the pointer locking command is received.

Once the pointer is locked within a frame associated with an embedded application, the local pointer is hidden, a new pointer is drawn within the frame, and the pointer events are sent to the virtual execution environment.

In another illustrative example, the client-side executable script may implement instant pointer redirection, which involves sending pointing device events to the virtual execution environment when the pointer is located within a frame associated with an embedded application.

The client-side executable script may further forward to the virtual execution environments other user interface events which are associated with a frame of an embedded application. Such events may include keyboard events (such as keydown and keyup events) that are received while a frame of an embedded application has the input focus.

In certain implementations, the client-side executable script may further intercept the user interface commands attempting to resize a frame of an embedded application or the remote application window located within the frame, and may prevent the frame or the remote application window from being resized by reverting the resize command immediately after it has been executed by the browser (e.g., by issuing an application programming interface (API) call to restore the initial size of the frame or the remote application window). Preventing the frame or the remote application window from being resized may be needed in order to enable continuing pointing device command translation without resizing the corresponding window rendered by the virtual execution environment, since such resizing would involve re-establishing the remote access session with the virtual execution environment.

In certain implementations, the client-side executable script may further intercept the user interface commands attempting to move a frame of an embedded application or to move the remote application window, and may revert the movement command immediately after it has been executed by the browser (e.g., by issuing an API call to restore the initial position of the frame). Preventing the frame or the remote application window from being moved may be needed in order to enable continuing pointing device command translation without moving the corresponding window rendered by the virtual execution environment, since such moving would involve re-establishing the remote access session with the virtual execution environment.

Figure 5:
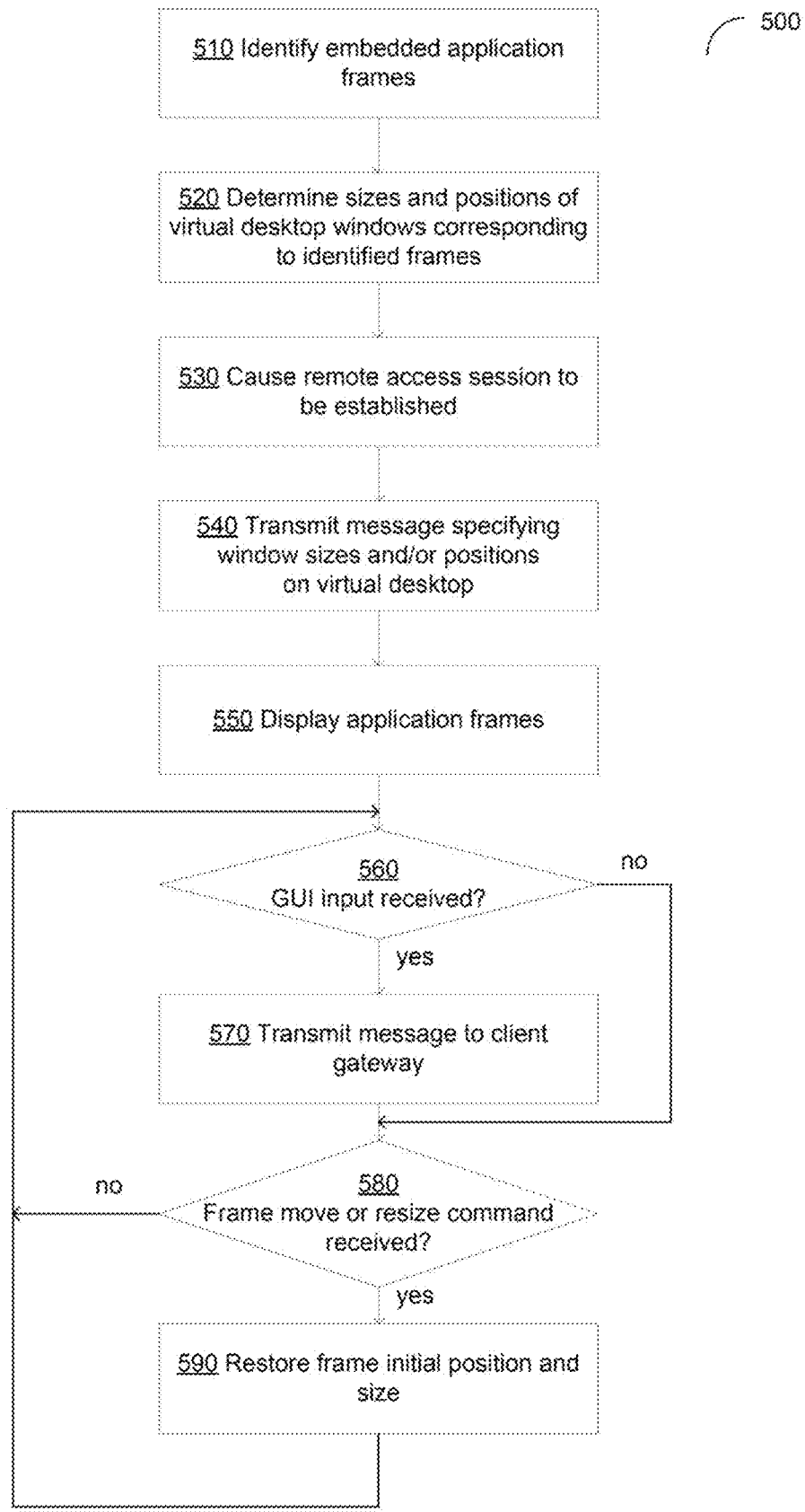
FIG. 5 depicts a flow diagram of an example method implemented by a client-side executable script for embedding remote applications into HTML pages, in accordance with one or more aspects of the present disclosure.

FIG. 5 depicts a flow diagram of one illustrative example of method 500 of embedding remote applications into HTML pages, which may be performed by a client-side executable script operating in accordance with one or more aspects of the present disclosure. Method 500 and/or each of its individual functions, routines, subroutines, or operations may be performed by one or more processors of the computer system (e.g., client device 140 of FIG. 1) implementing the method. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processing threads implementing method 500 may be executed asynchronously with respect to each other.

At block 510, a client device implementing the method identify one or more embedded application frames within an HTML page rendered by a browser. Each embedded application frame may include a hyperlink referencing a remote application that is published by a virtual execution environment. The virtual execution environment may be provided, e.g., by a remote desktop server, a virtual desktop interface (VDI) agent running on a host computer system executing a virtual machine, a guest agent installed in a guest operating system of a virtual machine running on a host computer system, or a remote personal computer (PC) agent running on a personal computer system, as described in more detail herein above.

At block 520, the client device may determine the sizes and/or the positions of windows for rendering, on a virtual desktop produced by the virtual execution environment, the output of the applications referenced by the embedded application frames. The client device may parse the embedded application hyperlink contained by the respective frame in order to extract the height and width of the frame. Based on the sizes for all embedded application frames contained by the currently displayed HTML page, the client device may determine the sizes and positions of corresponding application windows on the virtual desktop, as explained in more detail herein above.

At block 530, the client device may cause a remote access session to be established with the virtual execution environment. In an illustrative example, the client device may identify an existing remote access session associated with a user account referenced by the HTML page. Alternatively, the client device may initiate a new remote access session with the remote execution environment, as described in more detail herein above. When establishing a remote access session with the virtual execution environment, the client device may communicate to the virtual execution environment the sizes and positions of corresponding application windows on the virtual desktop, as determined by the operations of block 520.

At block 540, the client device may transmit, to the client gateway, a message specifying the sizes and/or the positions of the application windows on the virtual desktop, as described in more detail herein above.

At block 550, the client device may cause the browser to display the embedded application frames within the HTML page for rendering output of the remote applications, as described in more detail herein above.

Responsive to receiving, at block 560, a user interface input associated with an embedded application frame, the client device, at block 570, may transmit, to the client gateway, a message reflecting the user interface input. Preparing the message may involve translating a coordinate produced by the local pointing device into a remote coordinate within the window on the virtual desktop rendered by the virtual execution environment, as described in more detail herein above.

Responsive to receiving, at block 580, a user interface command purporting to move and/or resize the frame or the remote application window, the client device may, at block 590, cause the movement and/or resizing command to be reverted, by restoring the initial position and/or size of the frame or the remote application window, as described in more detail herein above, and the method may loop back to block 560.

Figure 6:
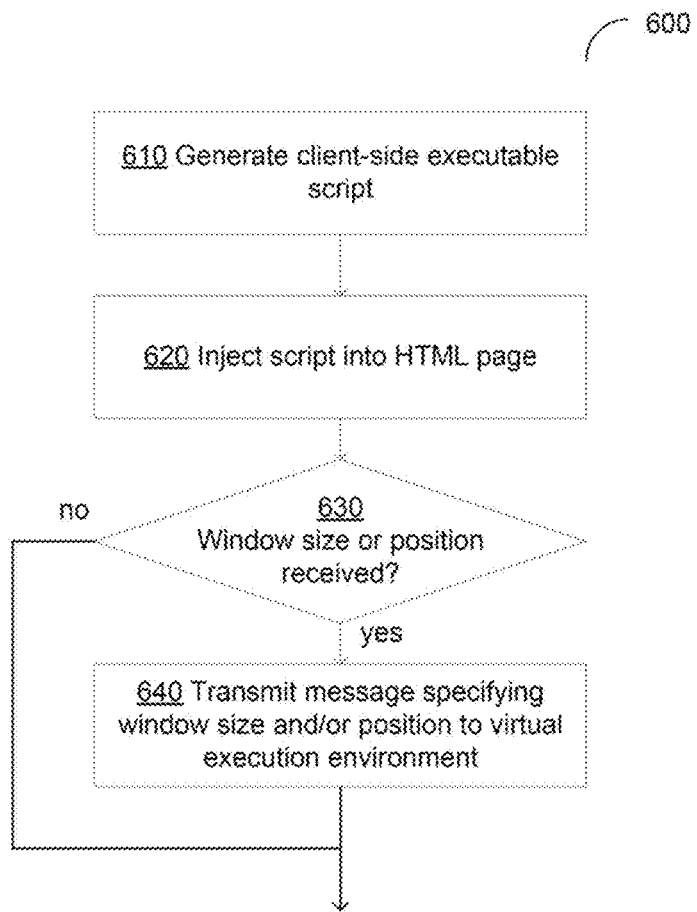
FIG. 6 depicts a flow diagram of an example method implemented by a client gateway for managing embedded application frames rendered by a client browser, in accordance with one or more aspects of the present disclosure.

FIG. 6 depicts a flow diagram of an example method implemented by a client gateway for managing embedded application frames rendered by a client browser, in accordance with one or more aspects of the present disclosure. Method 600 and/or each of its individual functions, routines, subroutines, or operations may be performed by one or more processors of the computer system (e.g., client gateway 135 of FIG. 1) implementing the method. In certain implementations, method 600 may be performed by a single processing thread. Alternatively, method 600 may be performed by two or more processing threads, each thread executing one or more individual functions, routines, subroutines, or operations of the method. In an illustrative example, the processing threads implementing method 600 may be synchronized (e.g., using semaphores, critical sections, and/or other thread synchronization mechanisms). Alternatively, the processing threads implementing method 600 may be executed asynchronously with respect to each other.

At block 610, a client gateway implementing the method may generate a client-side executable script for execution by a client browser for managing embedded application frames. The script may perform coordination of frame positions and sizes within the client browser window and corresponding windows rendered by the virtual execution environments, translation of pointing device input into coordinates of the corresponding virtual execution environment, and/or processing of certain other graphical user interface (GUI) events. In certain implementations, the script may cause the client device to identify embedded application frames in the currently displayed HTML page and determine sizes and/or positions of the corresponding application windows on the virtual desktop produced by the virtual execution environment. The script may further cause the client device to transmit, to the client gateway, a message specifying the window sizes and/or positions, as described in more detail herein above.

At block 620, the client gateway may cause the client-side executable script to be injected into an HTML page that is served to the client device, as described in more detail herein above.

Responsive to receiving, at block 630, from the client device, a message specifying window sizes and/or positions for rendering output of the remote application on the remote desktop, the client gateway may, at block 640 transmit, to the virtual execution environment, a message specifying the window sizes and/or positions, as described in more detail herein above.

Figure 7:
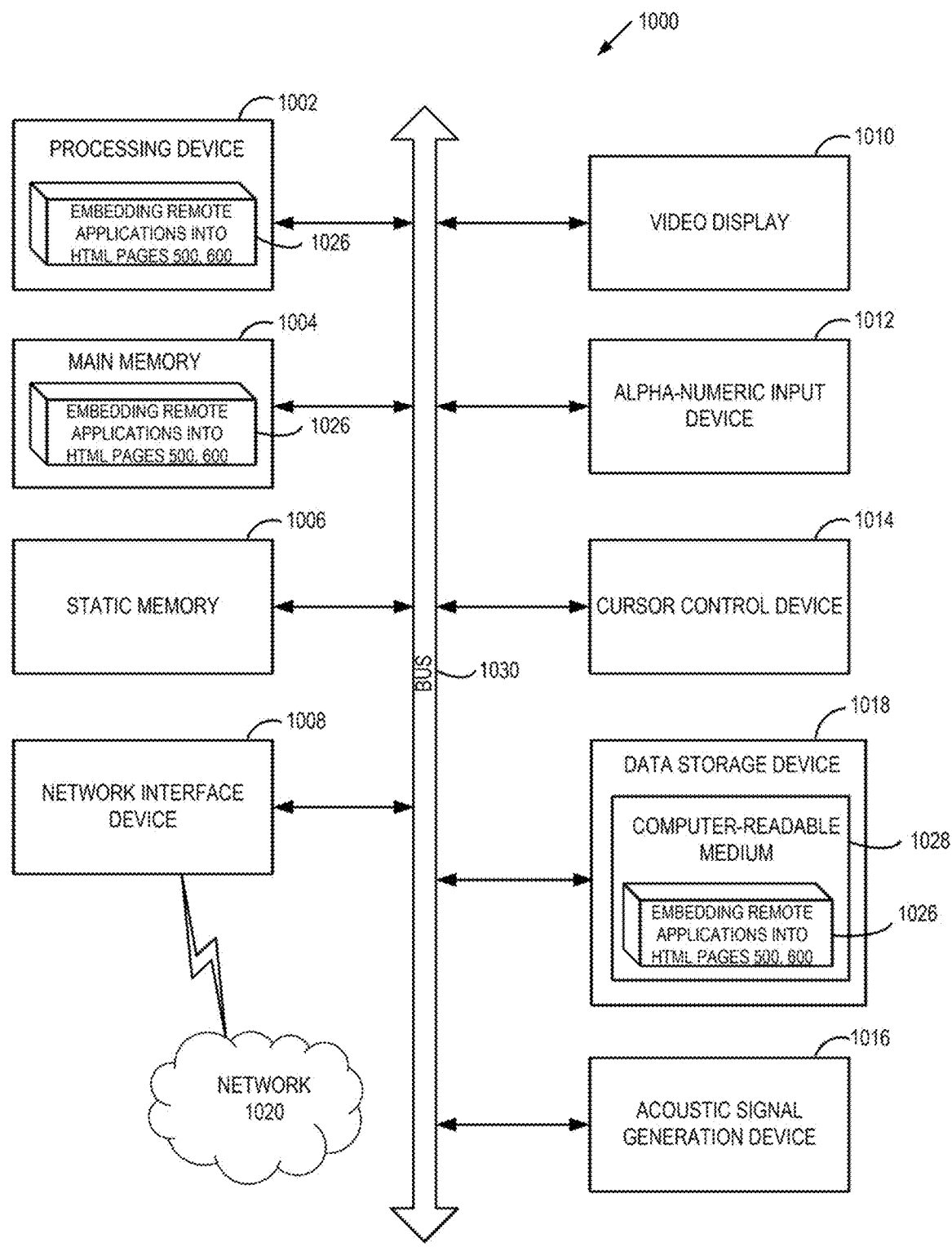
FIG. 7 depicts a block diagram of an example computer system operating in accordance with one or more aspects of the present disclosure.

FIG. 7 schematically illustrates a component diagram of an example computer system 1000 which may perform any one or more of the methods described herein. In various illustrative examples, computer system 1000 may represent the remote application server 110, client gateway 135, and/or client device 140 of FIG. 1.

Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute instructions implementing method 500 of embedding remote applications into HTML pages and/or method 600 of managing embedded application frames rendered by a client browser.

Example computer system 1000 may further comprise a network interface device 1008, which may be communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of method 500 of embedding remote applications into HTML pages and/or method 600 of managing embedded application frames rendered by a client browser.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown in FIG. 7 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. One or more non-transitory computer-readable storage media comprising executable instructions that, when executed by one or more processors, cause the one or more processors to:
execute a first process for provisioning access for a user to a remote application within a web page rendered to the user by a client device comprising the steps of:
establishing a selected set of applications to be rendered within the web page;
generating for each application within the selected set of applications a hyperlink;
embedding the set of hyperlinks for the selected set of applications with the web page to be served by a web portal to the user as the web page; and
serving the web page to the user upon the client device; wherein
the executable instructions when executed by one or more other processors cause the one or more other processors to execute a second process comprising:
rendering the web page to the user upon the client device;
parsing the set of hyperlinks to extract the frame dimensions of the frames for the applications within the set of selected applications;
determining in dependence upon the extracted frame dimensions of the frames for the applications within the set of selected applications a rendering location and rendering frame dimensions for each application within the set of selected applications; and
rendering each application of the selected set of applications in the web page based upon the determined rendering location and rendering frame dimensions for that application within the set of applications.

2. The one or more non-transitory computer-readable storage media according to claim 1, wherein
each application of the selected set of applications is to be rendered within a different frame within the web page.

3. The one or more non-transitory computer-readable storage media according to claim 1, wherein
the frame dimensions for the frame of an application of the set of selected applications are specified by the height of the frame and the width of the frame within the hyperlink associated with that application within the set of hyperlinks embedded within the web page.

4. The one or more non-transitory computer-readable storage media according to claim 1, wherein
each application of the selected set of applications is to be rendered within a different frame within the web page; and
the frame dimensions for the frame of an application of the set of selected applications are specified by the height of the frame and the width of the frame within the hyperlink associated with that application within the set of hyperlinks embedded within the web page.

5. The one or more non-transitory computer-readable storage media according to claim 1, wherein
the executable instructions when executed by the one or more processors further cause the one or more processors to execute a second process comprising:
rendering the web page to the user upon the client device; and
rendering the selected set of applications in the web page within the frame within the web page.

6. The one or more non-transitory computer-readable storage media according to claim 1, wherein
one of:
the second process employs a heuristic optimization method to minimize a total area of the web page rendered within a virtual desktop upon the client device; and
the second process employs a heuristic optimization method to minimize a total area of the web page rendered within a virtual desktop upon the client device without overlapping any of the frames associated with the selected set of applications.

7. A method comprising:
provisioning access for a user to a remote application within a web page rendered to the user by a client device by:
establishing a selected set of applications to be rendered within the web page;
generating for each application within the selected set of applications a hyperlink;
embedding the set of hyperlinks for the selected set of applications with the web page to be served by a web portal to the user as the web page;
serving the web page to the user upon the client device;
rendering the web page to the user upon the client device;
parsing the set of hyperlinks to extract the frame dimensions of the frames for the applications within the set of selected applications;
determining in dependence upon the extracted frame dimensions of the frames for the applications within the set of selected applications a rendering location and rendering frame dimensions for each application within the set of selected applications; and
rendering each application of the selected set of applications in the web page based upon the determined rendering location and rendering frame dimensions for that application within the set of applications.

8. The method according to claim 7, wherein
each application of the selected set of applications is to be rendered within a different frame within the web page.

9. The method according to claim 7, wherein
the frame dimensions for the frame of an application of the set of selected applications are specified by the height of the frame and the width of the frame within the hyperlink associated with that application within the set of hyperlinks embedded within the web page.

10. The method according to claim 7, wherein
each application of the selected set of applications is to be rendered within a different frame within the web page; and
the frame dimensions for the frame of an application of the set of selected applications are specified by the height of the frame and the width of the frame within the hyperlink associated with that application within the set of hyperlinks embedded within the web page.

11. The method according to claim 7, further comprising
rendering the web page to the user upon the client device; and
rendering the selected set of applications in the web page within the frame within the web page.

12. The method according to claim 7, wherein
one of:
determining the rendering location and rendering frame dimensions for each application within the set of selected applications employs a heuristic optimization method to minimize a total area of the web page rendered within a virtual desktop upon the client device; and determining the rendering location and rendering frame dimensions for each application within the set of selected applications employs a heuristic optimization method to minimize a total area of the web page rendered within a virtual desktop upon the client device without overlapping any of the frames associated with the selected set of applications.

13. A client device comprising:

a microprocessor; and a memory storing executable instructions which when executed by the microprocessor, cause the microprocessor to execute a first process for provisioning access for a user to a remote application within a web page rendered to the user upon the client device; and the first process comprises triggering a web portal to serve a web page via the steps of:

establishing a selected set of applications to be rendered within the web page;

generating for each application within the selected set of applications a hyperlink;

embedding the set of hyperlinks for the selected set of applications with the web page to be served by the web portal to the user as the web page; and serving the web page to the user upon the client device; wherein the executable instructions when executed by the microprocessor further cause the microprocessor to execute a second process comprising:

rendering the web page to the user upon the client device;

parsing the set of hyperlinks to extract the frame dimensions of the frames for the applications within the set of selected applications;

determining in dependence upon the extracted frame dimensions of the frames for the applications within the set of selected applications a rendering location and rendering frame dimensions for each application within the set of selected applications; and rendering each application of the selected set of applications in the web page based upon the determined rendering location and rendering frame dimensions for that application within the set of applications.

14. The client device according to claim 13, wherein each application of the selected set of applications is to be rendered within a different frame within the web page.

15. The client device according to claim 13, wherein the frame dimensions for the frame of an application of the set of selected applications are specified by the height of the frame and the width of the frame within the hyperlink associated with that application within the set of hyperlinks embedded within the web page.

16. The client device according to claim 13, wherein each application of the selected set of applications is to be rendered within a different frame within the web page; and the frame dimensions for the frame of an application of the set of selected applications are specified by the height of the frame and the width of the frame within the hyperlink associated with that application within the set of hyperlinks embedded within the web page.

17. The client device according to claim 13, wherein the executable instructions when executed by the microprocessor further cause the microprocessor to execute a second process comprising:

rendering the web page to the user upon the client device; and rendering the selected set of applications in the web page within the frame within the web page.

18. The client device according to claim 13, wherein one of:

the second process employs a heuristic optimization method to minimize a total area of the web page rendered within a virtual desktop upon the client device; and the second process employs a heuristic optimization method to minimize a total area of the web page rendered within a virtual desktop upon the client device without overlapping any of the frames associated with the selected set of applications.

* * * * *